United States Patent

Pawsey et al.

[11] Patent Number: 6,116,256
[45] Date of Patent: Sep. 12, 2000

[54] SUNSHADE

[75] Inventors: Rayman James Pawsey, Preston; Christopher Collins, Belgrave Heights, both of Australia; Lun Chai, Ma On Shan, The Hong Kong Special Administrative Region of the People's Republic of China; Dan Sheehan, Santa Clara, Calif.

[73] Assignee: Quantum Auto (Hong Kong) Limited, The Hong Kong Special Administrative Region of the People's Republic of China

[21] Appl. No.: 09/119,830

[22] Filed: Jul. 21, 1998

[30] Foreign Application Priority Data

Jul. 21, 1997 [AU] Australia ................. PO8105

[51] Int. Cl.[7] .................................................. E04H 15/48
[52] U.S. Cl. ................. 135/147; 135/120.3; 135/126; 135/128; 135/135; 160/370.21; 160/DIG. 2; 160/DIG. 3; 160/DIG. 13; 296/97.4; 296/97.7; 296/97.8; 296/97.9
[58] Field of Search ................. 296/97.4, 97.6, 296/97.7, 97.8, 97.9; 160/370.21, 370.23, DIG. 2, DIG. 13, DIG. 3; 135/125, 126, 128, 143, 147, 95, 100, 120.3, 135, 136; 403/170–173, 176, 113, 119, 217–219

[56] References Cited

U.S. PATENT DOCUMENTS

| | | | |
|---|---|---|---|
| 2,736,375 | 2/1956 | Rupert | 160/370.21 X |
| 4,349,040 | 9/1982 | Miller | 135/147 X |
| 4,363,513 | 12/1982 | Sahar | 160/DIG. 3 X |
| 4,433,699 | 2/1984 | Schultes et al. | |
| 4,632,138 | 12/1986 | Irwin | 135/143 |
| 4,711,260 | 12/1987 | Wiens et al. | 135/33.2 X |
| 4,962,780 | 10/1990 | Engdam | 135/33.2 |
| 5,038,812 | 8/1991 | Norman | 135/126 |
| 5,116,273 | 5/1992 | Chan | 160/370.21 |
| 5,213,123 | 5/1993 | Whitfield | |
| 5,213,147 | 5/1993 | Zheng | 296/97.8 X |
| 5,284,198 | 2/1994 | Kauka | |
| 5,551,464 | 9/1996 | Kelly | 135/33.2 |
| 5,601,103 | 2/1997 | Dubinsky | 135/33.2 X |
| 5,645,119 | 7/1997 | Caruso | |
| 5,816,310 | 10/1998 | Wu | 160/370.21 |
| 5,868,152 | 2/1999 | Brown | 135/33.2 X |

FOREIGN PATENT DOCUMENTS

| | | |
|---|---|---|
| 3113994 | 10/1982 | Germany . |
| 4121623 | 11/1992 | Germany . |
| 1590626 | 6/1981 | United Kingdom . |

*Primary Examiner*—Carl D. Friedman
*Assistant Examiner*—Yvonne M. Horton
*Attorney, Agent, or Firm*—Raymond Sun

[57] ABSTRACT

A collapsible sun shade, including: a shade; at least two supports, each support having a first end and a second end, with the second end of each support coupled to the shade at spaced-apart locations thereof; and a connector coupled to the first end of each support; wherein the shade is adapted to assume an unstable equilibrium position in which the supports and the shade are substantially coplanar with the connector, a collapsed position when the shade and supports are on one side of the unstable equilibrium position in which the shade is folded, and a deployed position when the shade and supports are on the other side of the unstable equilibrium position in which the supports and the shade are expanded.

18 Claims, 13 Drawing Sheets

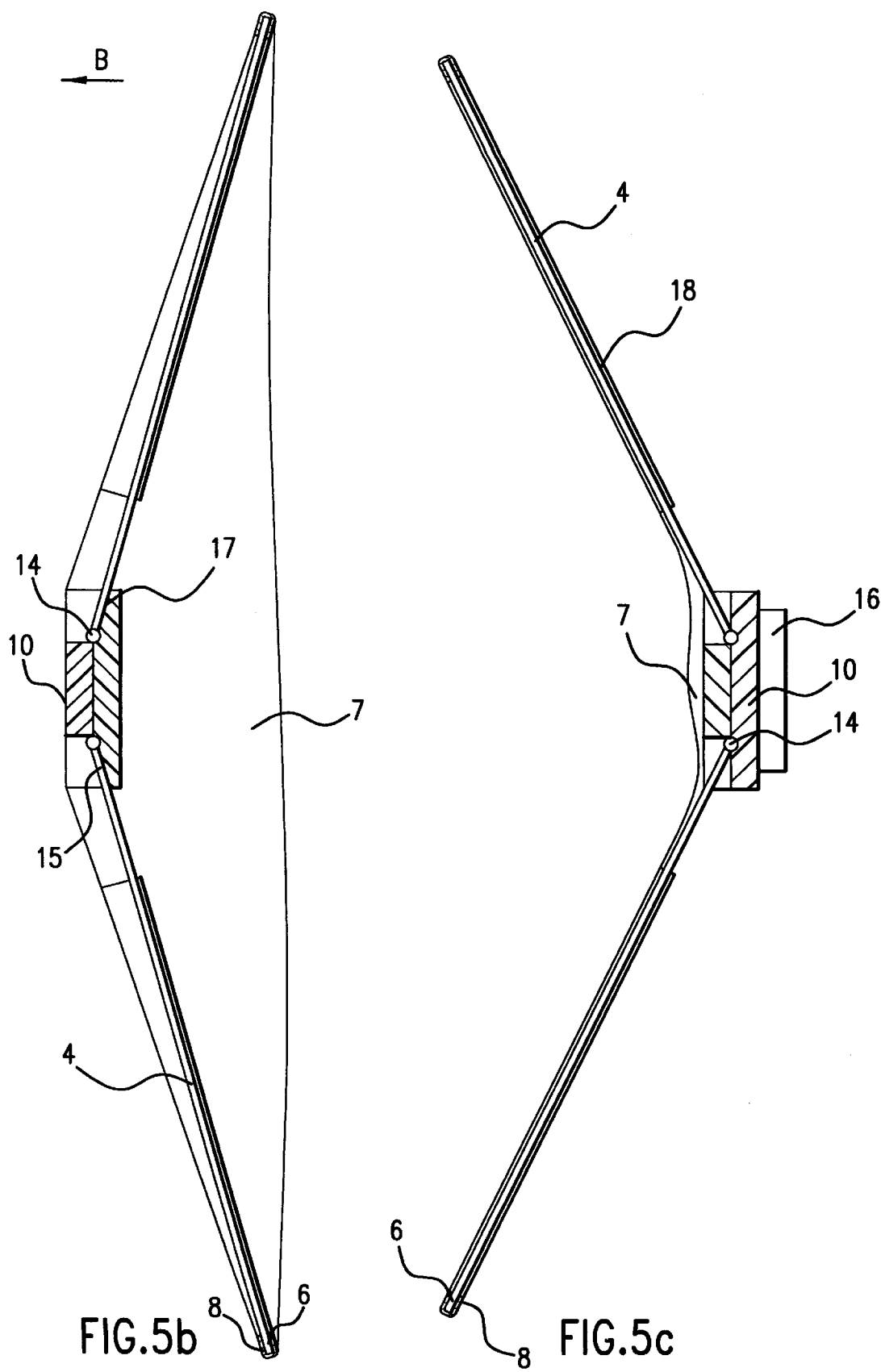

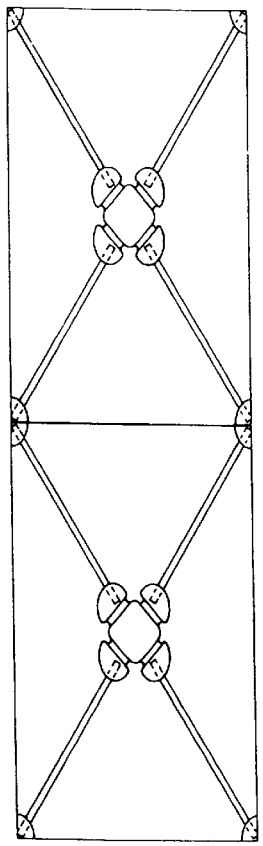
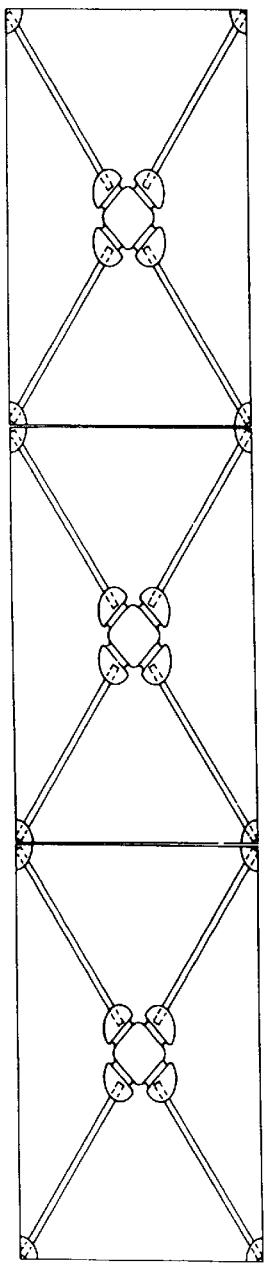
FIG 12A
FIG 12B
FIG 12C

SUNSHADE

FIELD OF THE INVENTION

The invention relates generally to sunshades for vehicles used for shading the interior of a vehicle from the heat of sunlight. In particular, the invention is particularly but not exclusively directed towards a sunshade appropriate for the front and rear windows of a vehicle.

BACKGROUND TO THE INVENTION

Vehicles, particularly cars, are commonly left unattended in places exposed to sunshine. For security, the windows of such a vehicle are usually closed and there is little airflow through the vehicle. Accordingly, the interior of the vehicle often warms up as a result of the sun shining on the vehicle. The temperature inside the vehicle may rise significantly above the ambient temperature to a temperature that is particularly uncomfortable when a person desires to enter the car. A further problem caused is that the significant heat generated may damage objects contained within the car or internal parts of the car which are sensitive to heat. Also, parts of the car which must be touched by the driver in order to properly drive the car may be heated to a temperature that is uncomfortable to touch with bare hands. This may lead to dangerous driving practices.

The problem of the temperature inside a car rising has existed for some time and is particularly acute in those places where there is greater exposure to sunshine. To some extent, this problem is also seasonal, being greater in summer. While one solution is to allow significant airflow through the vehicle (by, for example, opening all of the doors) and allowing the transfer of air to reduce the heat inside the vehicle before entering the vehicle, this may take some time which is often unacceptable to the driver, or other intended occupants, of the vehicle.

It is known to provide a substantially opaque material across the surface of the windscreen of a vehicle (whether inside or outside) so as to shade the interior of the vehicle. This has been found to reduce the rate at which the temperature inside the vehicle increases as well as reduce the temperature of controls necessary to properly operate the vehicle. In addition, reflective coatings have been applied to such materials to better reflect heat and light from external sources, such as the sun.

It is also known to provide such sunshades in a relatively closely woven netting form so as to provide shade without completely blocking out all light. This is particularly appropriate for side windows where the shades may be left in place while the vehicle is being driven and permit some transparency for occupants of the vehicle to see through them.

A difficulty with all of these methods has been a complicated or time-consuming method for affixing the sunshades in place. It is known to use suction cups to affix the sunshade to a window and also to suspend or attach the sunshade to interior fittings of a vehicle, such as grab handles and rear vision mirrors. Other sunshades are known which are of sufficient rigidity that they retain (without external support) an expanded configuration and can be located between, for example, a rear vision mirror and the windscreen, with a lower edge supported by the vehicle dashboard, but these must be carefully folded after each use. Other sunshades are affixed by being placed, for example, along the inside of a front-side window, through the door hinge and across the outside of the windscreen and then through the opposite front door hinge along the inside of the opposite front door and thereby being jammed into position. A combination of these methods of attachment may be used. However, all of these methods require some effort and time in order to affix the sunshade, particularly where connection means, such as straps, clips and suction cups, must be affixed. Time and effort is also required in known products to store or stow the sunshade in the vehicle in a safe and tidy manner. It has been found that vehicle drivers prefer to minimise the time required in order to affix such a sunshade.

Thus, there remains a need for a vehicle sunshade which is relatively quick and easy both to install and to collapse or fold into a shape or configuration which may be stored safely and compactly in a vehicle.

SUMMARY OF THE INVENTION

In a first aspect, the invention generally provides a sunshade for a vehicle movable between an expanded condition and a collapsed condition including:

a collapsible shading means adapted to shade in use the vehicle's interior;

at least two mutually opposed support means, each having an inner end and an outer end, each outer end being connected to the shading means so as to enable the outer ends to hold the shading means in its expanded condition such that it shades the vehicle's interior;

connection means to hingedly connect the support means' inner ends to each other;

resilient biasing means to bias in either direction the connection means away from an unstable equilibrium configuration of the support means relative to each other when the connection means is in a position approximately coplanar with at least two of the outer ends;

stop means to limit movement in at least one direction of the connection means relative to the shading means.

According to a second aspect of the invention, there is provided a sunshade for a vehicle moveable between an expanded condition and a collapsed condition including:

a collapsible shading means adapted to shade in use the vehicle's interior;

at least two mutually opposed support means, each having an inner end and an outer end, each outer end being connected to the shading means;

connection means to hingedly connect the inner ends to each other;

resilient biasing means to bias in either direction the connection means;

stop means to limit movement in at least one direction of the connection means relative to the shading means, such that, in use, the sunshade may be placed against a firm surface in its collapsed condition and oriented with the support means' outer ends closer to the surface than the connection means and the connection means pushed toward the surface to expand the shading means, the connection means moving through a first position at which the resilient biasing means begins to resist continued movement in the same direction of the connection means, then through a second position of unstable equilibrium of the resilient biasing means and the support means relative to each other, then to a third stable position resulting from cooperation between the stop means and the resilient biasing means and the sunshade is in an expanded condition supported by the support means, the sunshade being collapsible by the reverse process.

The invention therefore provides a collapsible sunshade having a shade and at least two supports, with each support having a second end coupled to the shade at spaced-apart locations thereof, and a first end coupled to a connector. The shade is adapted to assume an unstable equilibrium position in which the supports and the shade are substantially coplanar with the connector, a collapsed position when the shade and supports are on one side of the unstable equilibrium position in which the shade is folded, and a deployed position when the shade and supports are on the other side of the unstable equilibrium position in which the supports and the shade are expanded. The sunshade further includes a stop which is engaged by the connector when the shade is in the deployed position.

According to an embodiment of the present invention, the connector acts as a hinge for the shade about the unstable equilibrium position. The connector has a central portion, and one leaf for coupling with the first end of each support, with each leaf hingedly connected to the central portion by an integral thin hinge section. The central portion has one stop edge adjacent each thin section, and each leaf has one stop edge adjacent each thin section, with the stop edges of each corresponding leaf and the central potion engage each other when the shade is in the deployed position. The central portion can be provided in a number of polygonal configurations the group of quadrilateral, rectangular, triangular, hexagonal, trapezoidal and pentagonal. A gripping handle may be provided on the connector.

In a preferred form of the invention the resilient biasing means includes the shading means and the shading means has sufficient elasticity to provide the resilient biasing means.

In an alternative form of the invention, the resilient biasing means includes a piece of resilient material or a spring located between the inner ends of the support means such that, in the second position (the position of unstable equilibrium), the inner ends at the support means are urged apart. More preferably, the shading means is the stop means.

Preferably each support means is a rod. More preferably, there are four rods and the shading means is generally rectangular, each outer end being connected adjacent a corner of the shading means.

The connection means may take a number of forms. In one preferred form, it includes a central portion with a hinged connection to the inner end of each rod, each hinged connection being adapted such that rotation beyond a predetermined point is prevented. More preferably, the hinged connection includes a hinge having two leaves, the two leaves being connected along parallel opposed edges of the opposed end faces of each leaf such that the hinge permits rotation of the leaves through at least 90° relative to each other in one direction, but prevents rotation in normal use in the other direction by the abutment of the opposed end faces of each leaf. More preferably, the central portion forms one leaf of each pair of leaves forming a hinged connection.

In an alternative embodiment, the connection means has a face on one side adapted to receive the inner ends of at least two of the rods, each inner end being connected to the face such that each rod can rotate away from the face but rotation in the opposite direction is limited by abutment of the rod against the face. Preferably, the face includes a groove or slot for each inner end to receive part of that inner end. More preferably, each inner end has a foot portion angled relative to the remaining part of the inner end, the foot portion and the remaining part of the inner end adjacent to the foot portion being receivable within the groove and the angle between the foot portion and the remaining portion being substantially right-angled so as to permit rotation of the rod relative to the connection means when the foot portion is captive within the groove.

In a preferred embodiment, the connection means is attached to the shading means to facilitate folding of the shading means in the collapsed condition.

In a preferred embodiment, the connection means includes the stop means.

Preferably, the outer ends of the support means are attached to a periphery of the shading means.

Preferably, the sunshade further includes a collapsing knob which, in use, can be held by a user to facilitate moving the connection means to move the sunshade from an expanded condition to a collapsed condition. More preferably, the knob is connected to or part of the connection means.

Preferably the sunshade is adapted to be located in use between a sun visor and windscreen of a vehicle at its upper edge and on the dashboard at its lower edge. More preferably, the sunshade extends across about half of a vehicle windscreen.

In another preferred embodiment, the sunshade has additional means to affix it to a window. These means may include suction cups, "Velcro" tags for attachment to grab handles, "Velcro" strips and the like.

Advantageously, the connector is a first connector, and the sunshade further includes a second connector and a connecting support having a first end coupled to the first connector and a second end coupled to the second connector, and with each connector coupled to the first end of at least one of the supports.

In use, a plurality of sunshades may be deployed in a side-by-side manner.

The sunshade may additionally be provided with a side panel attached to one side or edge of the sunshade. The side panel is adapted to cover an upper portion of a vehicle seat when the sunshade itself is deployed against the windscreen.

BRIEF DESCRIPTION OF DRAWINGS

The invention will now be described by way of example only, with reference to the accompanying illustrative drawings, in which:

FIGS. 5a, 5b and 5c are cross-sectional views of the connection means and support means for the embodiment of the invention as shown in FIG. 1 in the collapsed condition, fully expanded condition and partly expanded condition respectively.

FIGS. 12A–12C illustrate how a combination of the sunshade of FIGS. 10 and 11 can be configured to cover larger areas.

For convenience only, in the drawings illustrating the invention, like numerals in the drawings refer to like components.

DESCRIPTION OF PREFERRED EMBODIMENTS

Figure 2:
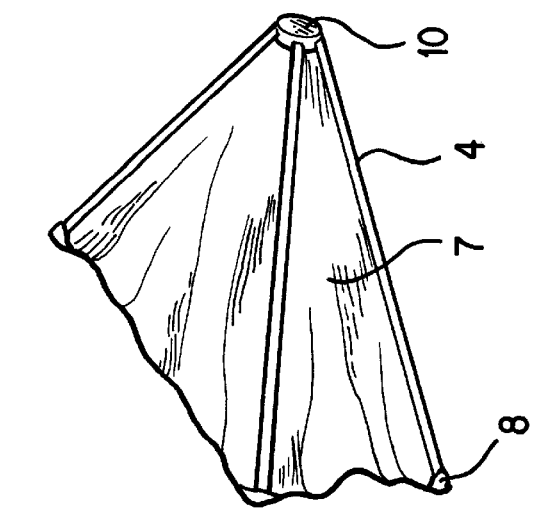
FIG. 2 is a perspective view of the sunshade of FIG. 1 in a partly collapsed condition.
Figure 3:
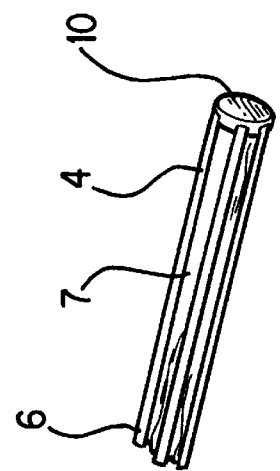
FIG. 3 is a perspective view of the sunshade of FIG. 1 in a fully collapsed condition.
Figure 1:
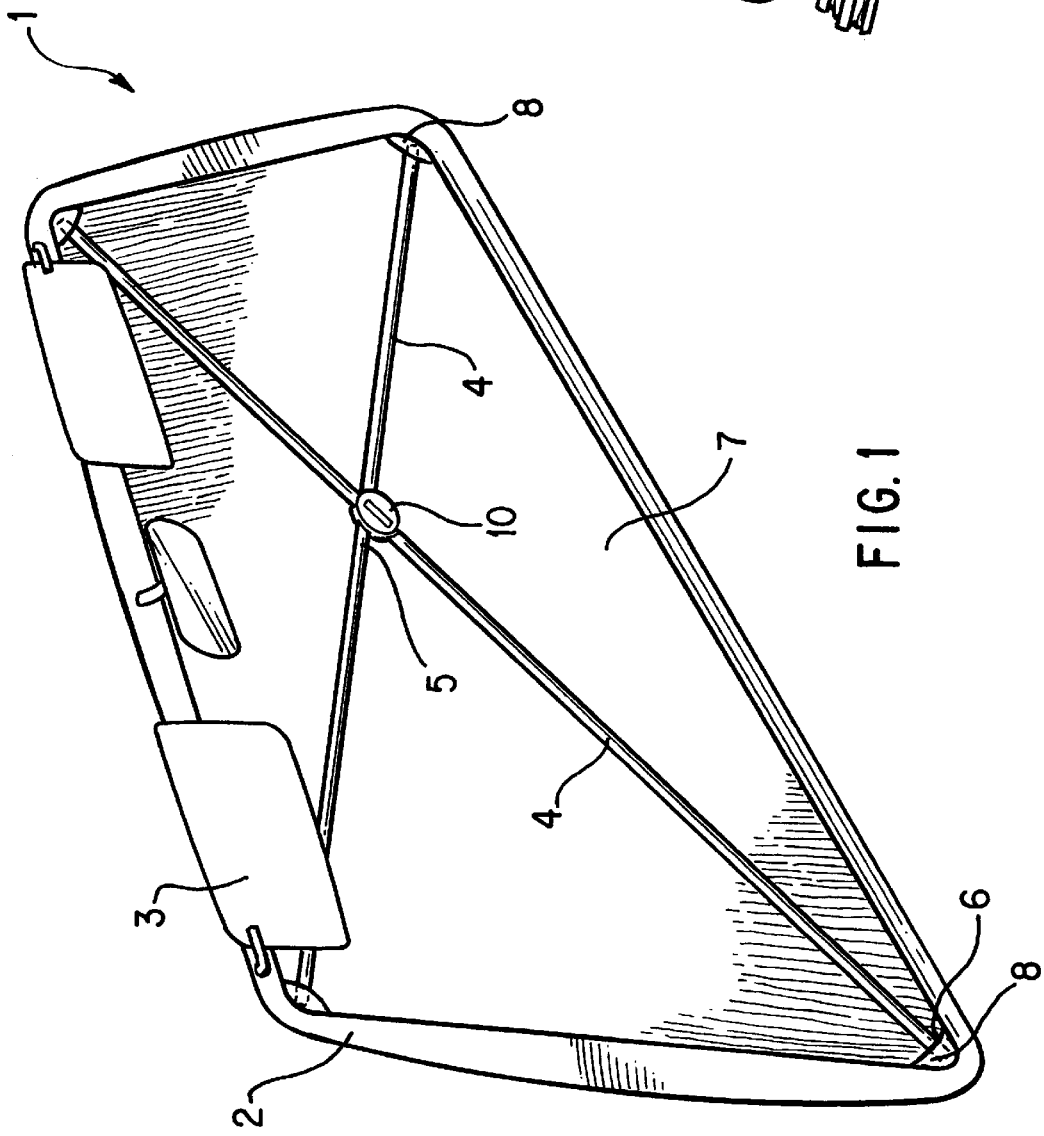
FIG. 1 shows a perspective view of a sunshade for a vehicle adapted to fit across a complete windscreen according to a first preferred embodiment of the invention.

Referring to the drawings, FIG. 1 illustrates a collapsible sunshade 1 located between the vehicle windscreen 2 and sun visors 3. The sunshade includes a plurality of supports 4, each having an outer end 6 and an inner end 5. Each support 4 can be a rod made of a relatively stiff material, such as sprung steel, fibreglass, or plastic. Each outer end 6 is connected to the collapsible shading means 7 which generally abuts the windscreen and is held in its expanded configuration by the support means 4. The shade 7 can be a thin sheet material having a slight elasticity and good shielding properties, such as a fabric cloth of natural, synthetic or blend fibre, plastic film or sheet, metal foil, TYVEK™ spunbonded olefin, or a laminate material. The shade 7 can also be provided in a meshed material or fabric to allow some visibility therethrough. A reflective coating or film can be provided on the top surface of the shade 7 to reflect sunlight and repel heat radiation.

Inner ends 5 of the support means 4 are connected at connection means 10. The detail of that connection is more clearly shown in FIGS. 5a, 5b, 5c, 6 and 7 described below. In this embodiment, the shade 7 also functions to resiliently bias the connector 10 in either direction away from an unstable equilibrium configuration of the supports 4 relative to each other when the connector 10 is in a position approximately co-planar with at least two of the outer ends 6, as described in greater detail hereinbelow.

In the embodiment shown in FIG. 1, four rods 4 are provided to support a generally rectangular shade 7. Each outer end 6 of each rod 4 is attached to the shade 7 by the formation of a small generally triangular pocket 8 at each corner of the shade 7. An attachment mechanism is provided inside each pocket 8 to prevent the outer and end 6 from being inadvertently removed from the pocket 8 when the sunshade 1 is in its collapsed condition. Such attachment mechanisms can include a thread (not shown) attached to the shade 7 and passed through a bore (not shown) provided in the support 4 adjacent its outer end 6.

Figure 6:
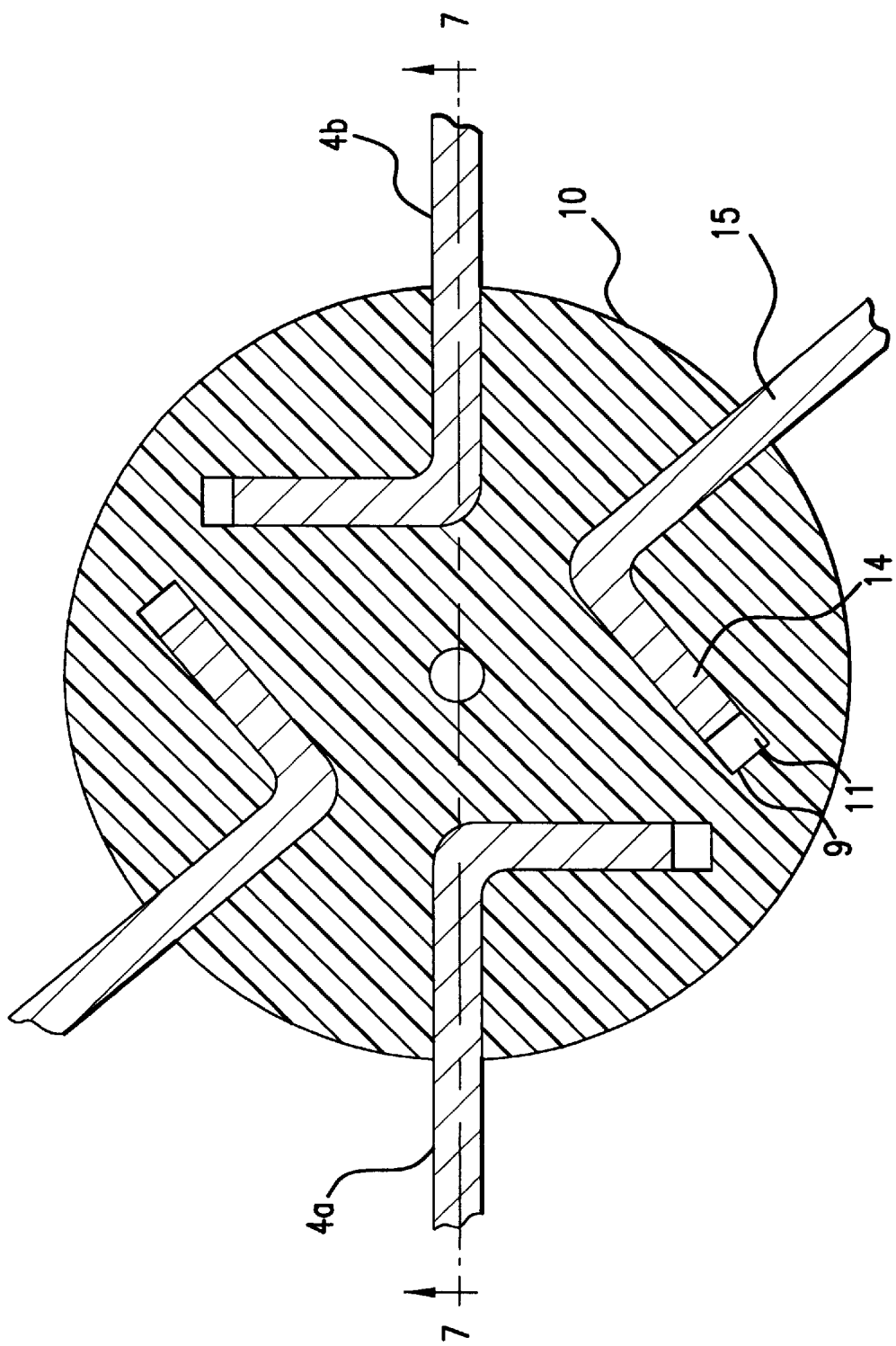
FIG. 6 illustrates a cross-sectional view of a connection means according to a third preferred embodiment of the invention with the sunshade in its expanded condition.
Figure 7:
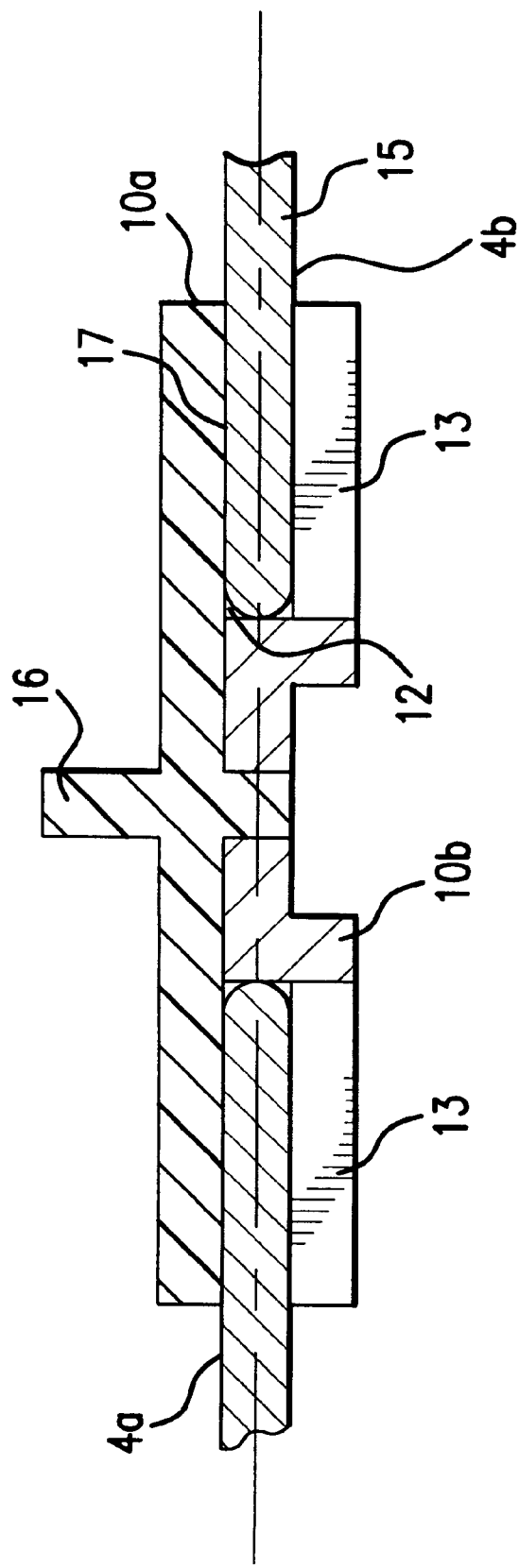
FIG. 7 shows a section through the line A—A in FIG. 6.

Referring now to FIGS. 6 and 7, the inner end 5 of each support 4 is located in the connector 10. The connector 10 may be made of a relatively hard material, such as plastic. The connector 10 is made from two separate housing pieces 10a and 10b that are connected together. Connector 10 includes a cavity 12 and groove 13. Each cavity and groove is formed by gaps provided in and between the two housing pieces 10a and 10b. The foot 14 and segment 15 of each inner end 5, are received within cavity 12 and groove 13 of the connector, respectively. Only the end of each cavity 12 can be seen in FIG. 6, and is illustrated by the empty space designated by the numeral 11.

The foot 14 is angled with respect to main segment 15 of support 4, and in the present embodiment is generally right-angled (i.e. about ninety degrees). The foot 14 is contained within the correspondingly shaped cavity 12 in connector 10 and is retained as a result of the limited movement permitted of the segment 15 in the plane of the connector 10 against the wall of groove 13. Cavity 12 therefore forms a hinged connection between connector 10 and support 4.

Figure 5A:
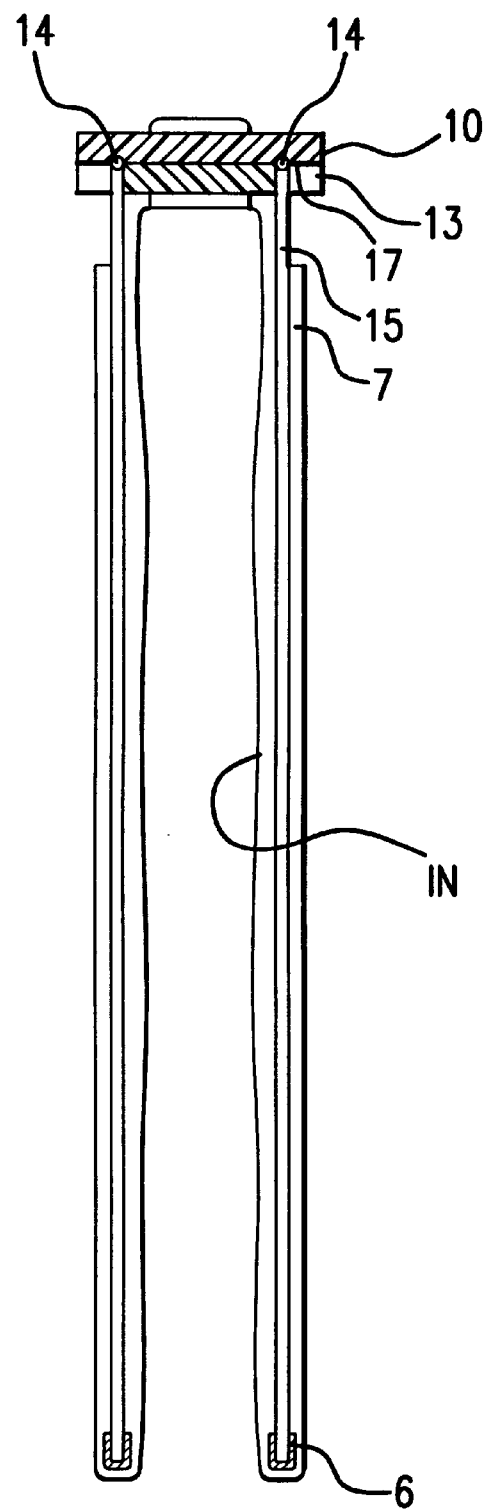

As best illustrated in FIG. 7, in use, each foot 14 of each inner end 5 is retained in a cavity 12 of the connector 10. In FIG. 7, the foot 14 of the left support 4a protrudes out of the page towards the reader, whereas the foot 14 of the right support 4b extends into the page. When the shade is moved from the expanded state shown in FIG. 5b to the collapsed state shown in FIG. 5a, each support 4 rotates out of the groove 13 by being moved by a user holding the connector 10 (or knob 16) with one hand and one of the supports 4 with the other, thereby rotating foot 14 within cavity 12. The supports 4 move away from the plane of the connector 10 (as shown in FIG. 5b) towards each other to a perpendicular position with respect to the plane of connector 10, to collapse the shade (as shown in FIG. 5a). In the collapsed state, segments 15 of each support 4 protrude out of the page towards the reader, with reference to FIG. 6, and the outer ends 6 of the supports 4 have moved towards each other.

Similarly, as the shade is moved from its collapsed state to the expanded state, support 4 rotates towards groove 13, thereby rotating foot 14 within cavity 12 in the opposite direction, until segment 15 meets inner surface 17 of the connector. Further rotation of the support in this direction is limited by abutment of segment 15 of the support 4 against the inner surface 17 of housing piece 10a. As illustrated in FIG. 7, segment 15 is positioned within groove 13 formed by housing piece 10b. Housing piece 10a forms inner surface 17 that acts as a stop against which segment 15 abuts when the shade is expanded as illustrated in FIG. 5b. A knob 16 extends from the top of connector 10, and can be used by a user to grip the connector 10 to collapse the sunshade from its expanded condition.

FIGS. 5a, 5b and 5c illustrate the connector 10 at the different positions assumed by the sunshade 1. In this embodiment, the resilient biasing means is the shading means 7 which has some elasticity. Shading means 7 is fixedly connected to outer end 6 at a position such that shading means 7 is not fully stretched in the position shown in FIG. 5b or 5c but is substantially stretched in a position where the support means 4 are parallel (between the positions shown in FIGS. 5b and 5c). In FIG. 5a, the sunshade is in its fully collapsed condition and support means 4 is shown with outer ends 6 relatively close together. In this embodiment, the inner surface 17 of portion 13 is the stop means to limit rotation of outer ends 6 away from each other, as shown in FIG. 5b. In FIG. 5b, shading means 7 is providing resilient biasing means drawing outer ends 6 toward each other and the inner surfaces 17 on the two portions 13 shown are the stop means. In FIG. 5c, the sunshade is shown at an intermediate position shortly before the "first" position at which the shading means, as a resilient biasing means, starts to resist further movement of the connector 10 from the right to left as shown by arrow B.

Thus, the sunshade 1 may be deployed by gripping the connector 10 (such as at the grip 16), and then moving the connector 10 through a first position (shown in FIG. 5*c*) at which the shade 7 begins to resist continued movement in the same direction of the connection 10, then through a second position of unstable equilibrium of the shade 7 and supports 4 relative to each other (between FIGS. 5*b* and 5*c*), and then to a third stable or deployed position (shown in FIG. 5*b*) resulting in cooperation between the stop (i.e., inner of surface 17) and the shade 7. In the third position, the sunshade 1 is in an expanded position supported by the supports 4, with the outer ends 6 closer to the windscreen than the connector 10. The sunshade 1 can be collapsed by reversing the above steps; in particular, by applying force to cause the shade to pass through the unstable equilibrium position and subsequently, the first position, until the sunshade 1 is collapsed to the configuration shown in FIG. 5*a*.

Figure 4:
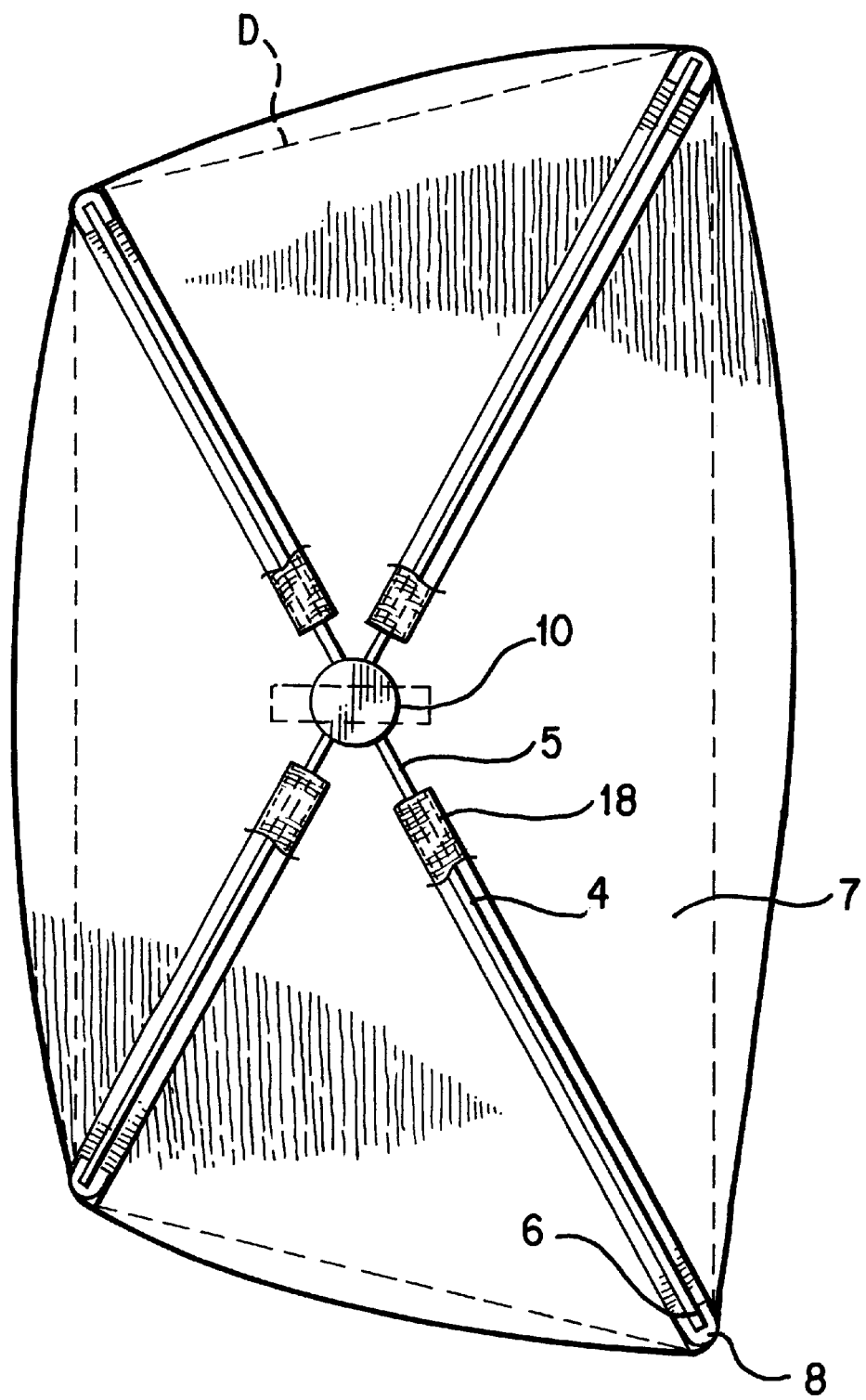
FIG. 4 is a plan view of a second embodiment of the invention in an expanded condition.

FIG. 4 shows a plan view of a second but broadly similar embodiment of the invention in which the shading means 7 is in its expanded condition. Support means 4 are located within longitudinal pockets 18 affixed to shading means 7. The detail of connection means 10 is not shown in FIG. 4 but is indicated generically by a circle. The dashed line between outer ends 6 indicates the line of tension in shading means 7 created by outer ends 6 and the resilient biasing means urging connection means 10 into the page towards shading means 7. The portions of shading means 7 outside this dashed line are thus less firmly held.

Figure 8A:
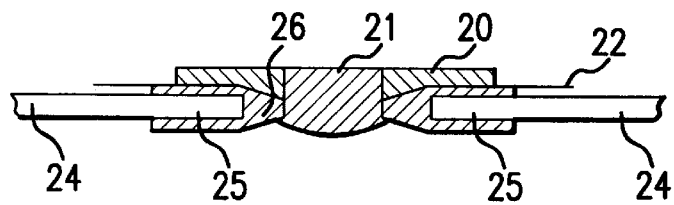
FIGS. 8a and 8b show a cross-sectional view and plan view respectively of a connection means of a fourth embodiment of the invention.
Figure 8B:
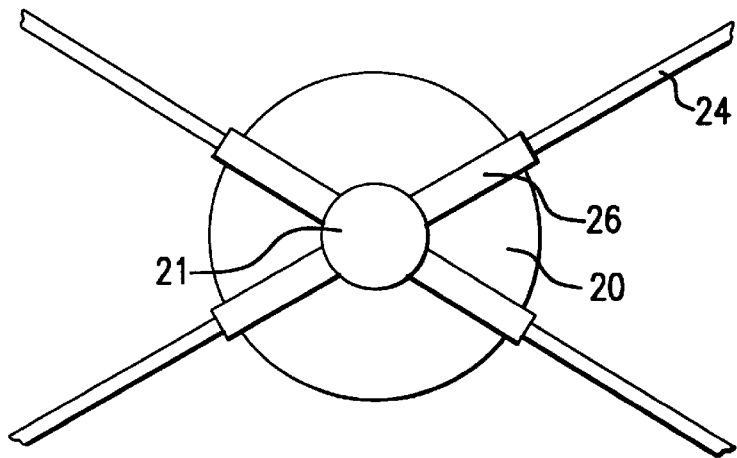

FIGS. 8*a* and 8*b* show an alternative construction for connector means 10, identified as 20. In this embodiment, resilient biasing means 26 (such as synthetic or natural rubber or a spring) includes a resilient material located between inner ends 25 of support means 24. In the embodiment shown, a central portion 21 of connection means 20 is located between the resilient biasing means 26 shown. Resilient biasing means 26 in this embodiment also form the hinge means and surface 22 provides the stop means to limit rotation of the support means 24.

Figure 9A:
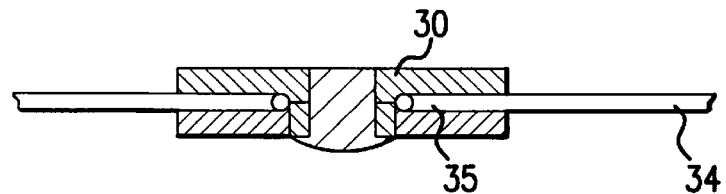
FIGS. 9a and 9b show a cross-sectional and plan view respectively of a connection means of a fifth embodiment of the invention.
Figure 9B:
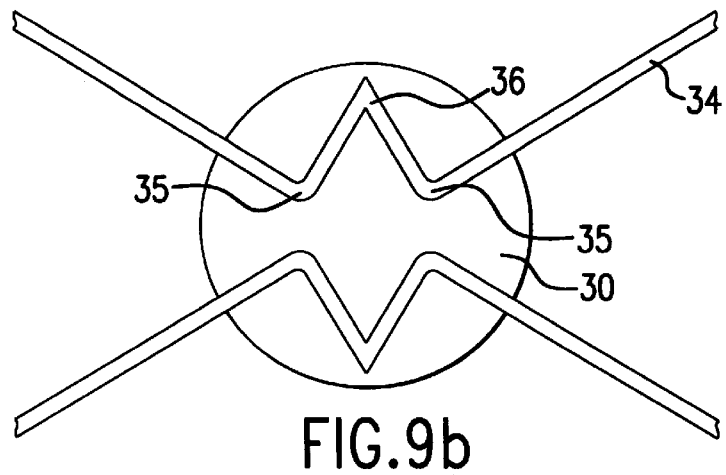

In FIGS. 9*a* and 9*b*, an alternative construction of connection means 10 is shown identified as 30. In this embodiment, inner ends 35 of support means 34 are connected by a resilient material. This material may be sprung steel. In the embodiment shown, two support means 34 are shown manufactured as one piece, connected at inner ends 35. Connection means 30 includes a planar surface which provides the stop means. The resilient biasing means 36 is integral to inner ends 35 and formed by "V" shaped sprung steel.

Figure 10A:
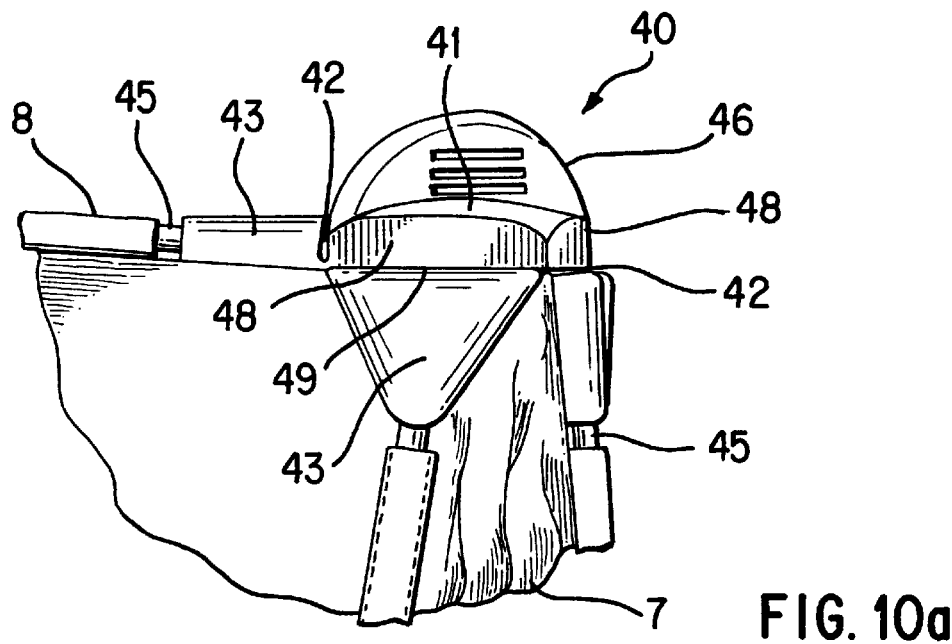
FIGS. 10a and 10b show a side and plan view of a connection means of a sixth embodiment of the invention.
Figure 10B:
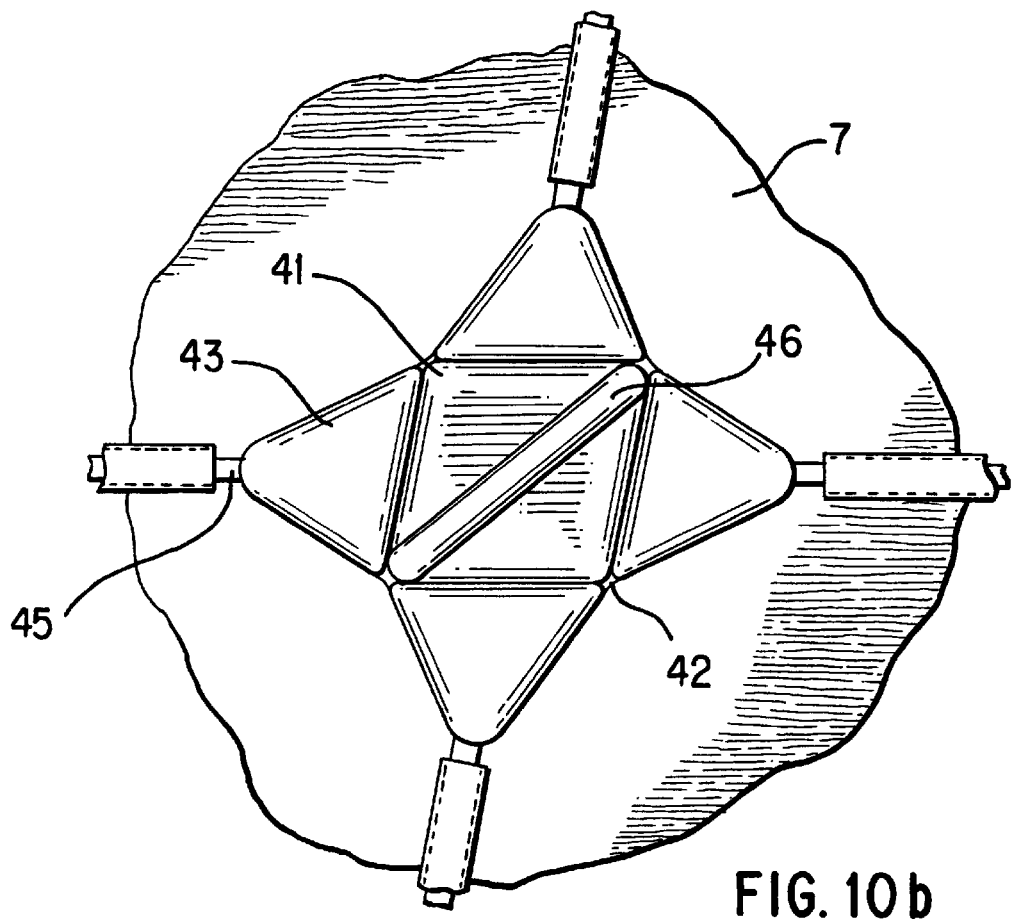

FIGS. 10*a*, 10*b*, 10*c* and 11 illustrate yet a further alternative construction for the connector 10, identified as 40. The connector 40 is illustrated in FIG. 10*a* with the left side of the connector 40 shown in the expanded position of the sunshade, and with the right side of the connector 40 shown in the collapsed position of the sunshade. This position is for illustration only and would not be used in normal use. The connector 40 has a quadrilateral central portion 41 with four generally triangular hinged leaves 43, each of which has one side which is hingedly connected to the central portion 41 by a respective integral relatively thin section 42. Each thin section 42 forms a separate hinge for the connector 40. Thus, the central portion 41 forms one leaf of each hinge and other leaf of the hinge is formed by an external leaf 43. Each external leaf 43 further includes a bore 43*a*, shown in phantom in FIGS. 10*a* and 10*c*, that is perpendicular to the hinge 42. The bore 43*a* receives an inner end 45 of a support 44. The supports 44 are held within each bore 43*a* by the tension in the shade 7 which is attached to both the outer ends of the supports 44 and to the central portion 41 (on the other side of connector 40 from the collapsing knob 46). The shade 7 is provided in a material that provides some elasticity, so that the shade 7 can operate to resiliently bias the connector 40 in either direction away from the unstable equilibrium position. The opposing end faces or edges 48 of the central portion 41, on the one hand, and face or edge 49 of each external leaf 43, on the other hand, abut to form a stop. Thus, each leaf 43 is able to rotate relative to the central portion 41 about the hinge 42 in one direction (i.e., away from the knob 46 or in the downward direction in FIG. 10*a*), but the abutment of the opposed parallel faces 48 and 49 prevents rotation in the opposite direction (i.e., in the upward direction in FIG. 10*a*) during normal use. The connection 40 can be made of a relatively hard material such as a plastic or metal.

Figure 11:
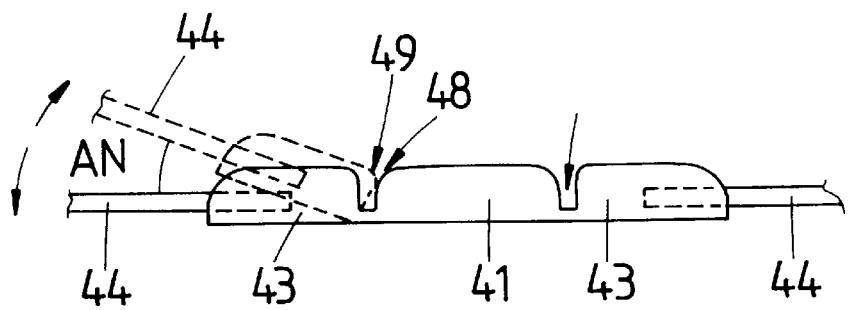
FIG. 11 is a cross-sectional view of the connector of FIGS. 10a and 10b.

The operation of the connection 40 is better illustrated in connection with FIG. 11. Two opposing leaves 43 are illustrated in the context of the central portion 41. The leaf 43 on the left side of FIG. 11 is shown in two different positions: the leaf 43 is shown in solid lines in a horizontal position (i.e., the unstable equilibrium position of the sunshade 1), and in dashed lines in the third stable or deployed position with the opposing faces 48 and 49 in abutment with each other. When in the third stable or deployed position, the leaf 43 is displaced from the horizontal position by an angle AN of approximately three to ten degrees. Thus, as illustrated in FIG. 11, when the leaf 43 passes the unstable equilibrium position, it is retained in the third stable or deployed position until a force (in the downward direction in FIG. 11) is applied to cause the leaf 43 to pass the unstable equilibrium position again. The resilience of the shade 7 assists in retaining the leaf 43 and the shade 7 in the third stable or deployed position.

In use, the sunshade 1 of the present invention is adapted to be positioned between a sun visor 3 and the windscreen 2 of a vehicle along the upper edge of the sunshade 1, and to be positioned along the dashboard at the lower edge of the sunshade 1. While FIG. 1 illustrates the sunshade 1 as covering the entire windscreen 2, it is also possible to provide a plurality of sunshades 1 to cover a windscreen 2, window or other area. For example, FIG. 12A illustrates the deployment of two sunshades 1 in a side-by-side manner to cover a windscreen 2. FIG. 12B illustrates the deployment of three sunshades 1 in a side-by-side manner. FIG. 12C illustrates the deployment of four sunshades 1 (two rows of two sunshades 1, one row above the other row) that are configured to cover a larger area.

Figure 13C:
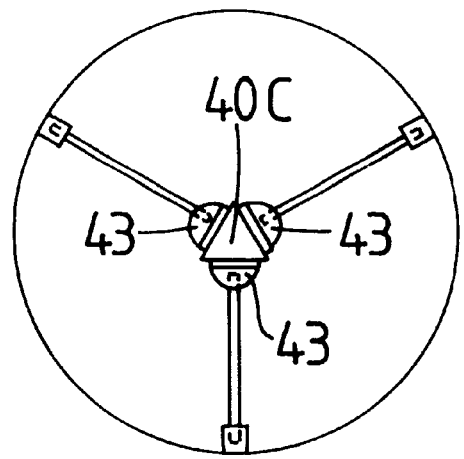
FIGS. 13A–13C illustrate sunshades similar to the sunshade of FIGS. 10 and 11, but having different shapes and number of leaves in their connectors.
Figure 13B:
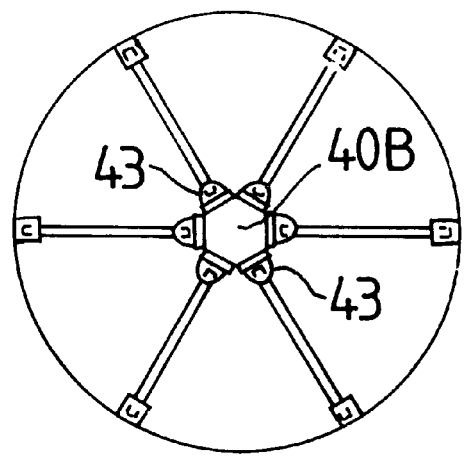
Figure 13A:
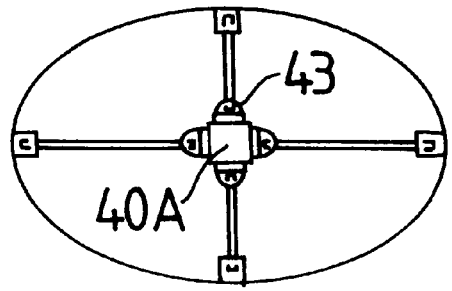

In addition, the shape of the sunshade 1 does not necessarily need to be rectangular. As illustrated in FIGS. 13A–C, the sunshade 1 can assume an oval or circular shape. Other shapes, such as trapezoidal, triangular, pentagonal, hexagonal, and irregular, can also be provided.

Figure 10:
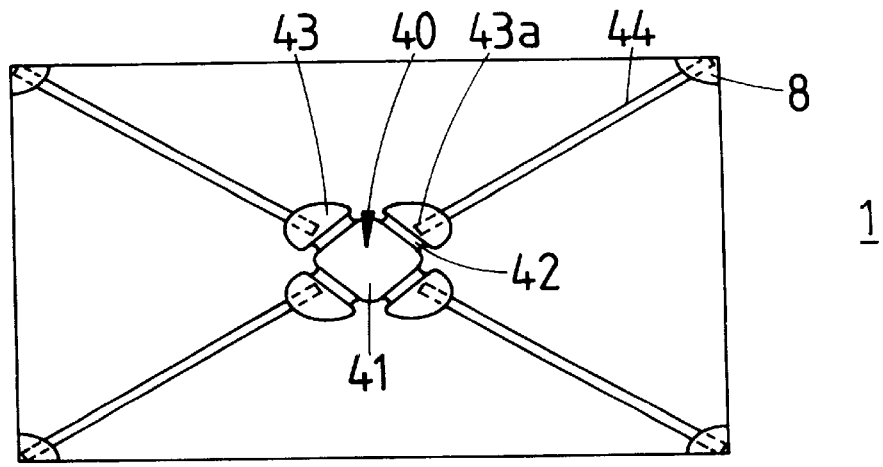
FIG. 10c is a perspective view of a sunshade utilising the connector of FIGS. 10a and 10b.

Moreover, although the connector 40 in FIGS. 10 and 11 is illustrated as having four leaves 43, it is also possible to provide the connector 40 with any number of leaves 43, with each leaf 43 adapted to connect a separate support 44. For example, FIGS. 13B and 13C illustrate connectors 40 having six and three leaves 43, respectively. In these cases, the configuration of the connector must be adapted to provide the opposing stop surfaces between each leaf and the connector. For example, the connector 40*a* in FIG. 13A has a generally rectangular configuration with four sides, each side adapted to oppose a stop surface from one of the four leaves. Similarly, the connector 40*b* in FIG. 13B has a generally hexagonal configuration with six sides, each side adapted to oppose a stop surface from one of the six leaves. Moreover, the connector 40*c* in FIG. 13C has a generally triangular configuration with three sides, each side adapted to oppose a stop surface from one of the three leaves.

Figure 14:
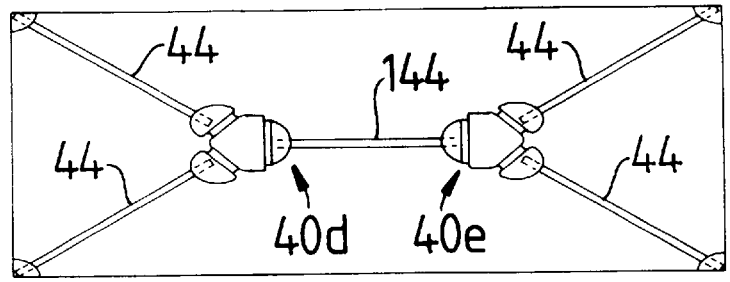
FIG. 14 illustrates a sunshade similar to the sunshade of FIGS. 10 and 11, but having a plurality of connectors.

FIG. 14 illustrates that more than one connector 40 can be provided to support the sunshade 1. For example, FIG. 14 illustrates a sunshade having two connectors 40*d* and 40*e*, each having three leaves 43. Two of the leaves 43 of each connector 40*d*, 40*e* are connected to a separate support 44 that has its outer end attached to a corner of the shade 7. A central support 144 has opposing ends connecting the remaining leaf 43 of each connector 40*d*, 40*e*. Each connector 40*d* and 40*e* can assume a configuration that provides three sides, each side adapted to oppose a stop surface from one of the three leaves. One advantage with the provision of a plurality of connectors 40 is that the support for the shade 7 is improved while minimising the number of supports 44 that are used.

Figure 15A:
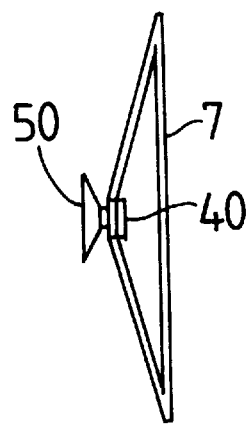
FIGS. 15A and 15B illustrate the use of suction cups with the sunshade of FIGS. 10 and 11.
Figure 15B:
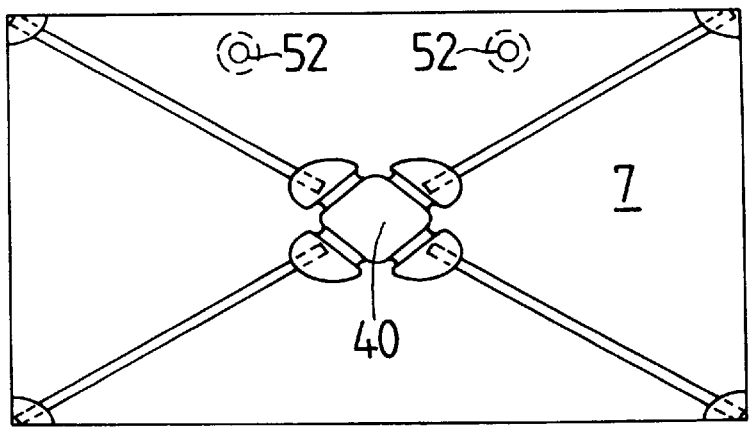

It is also possible to affix the sunshade 1 to a window, such as a side window of a vehicle, by using suction cups, VELCRO™ tags for attachment to grab handles, VELCRO™ strips, and the like. As shown in FIG. 15A, a suction cup 50 can be connected to the connector 40 (on the side of the knob 46) to affix the sunshade 1 to the window. Affixation through the use of the suction cup 50 brings the sunshade 1 closer to the window to allow the sunshade 1 to be more effective in shading the interior of a vehicle. FIG. 15B illustrates the attachment of suction cups 52 to the shade material 7 in spaced-apart manner. Any number of suction cups 50, 52 an be provided, and at any location on the connector 40 and/or the shade 7.

Figure 16A:
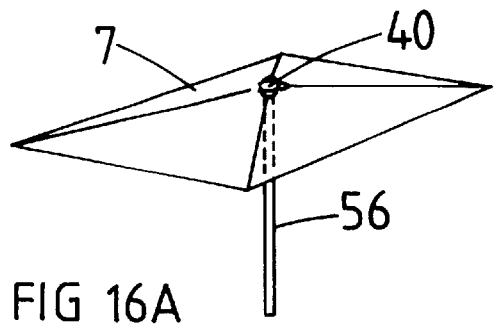
FIGS. 16A–16C illustrate how the sunshade of FIGS. 10 and 11 can be converted into an umbrella.
Figure 16B:
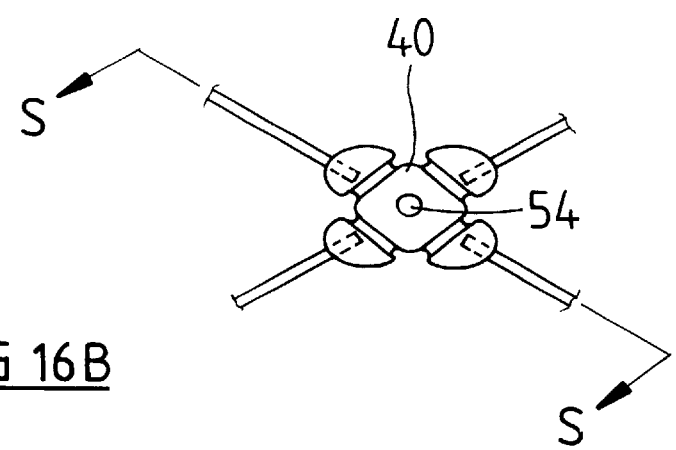
Figure 16C:
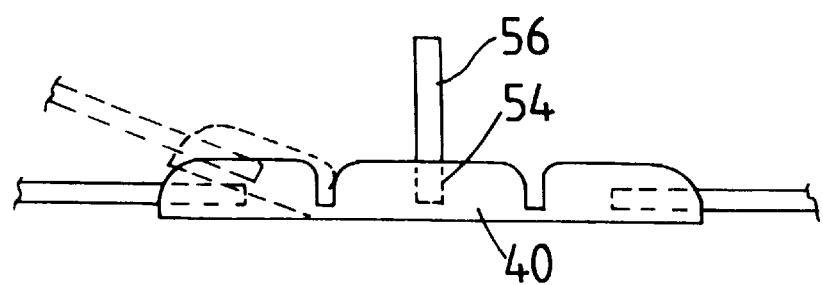

FIGS. 16A–16C illustrate an alternative use for the sunshade 1 of the present invention, in which the sunshade 1 can be converted into an umbrella. This can be accomplished by providing the connector 40 without the knob 46, and instead of the knob 46, providing a hole 54 on the same side of the connector 40 where the knot 46 was originally positioned. To convert the sunshade 1 into an umbrella, an end of a pole or shaft 6 can be inserted into the hole 54 and secured therein, as shown in FIGS. 16A and 16C. Alternatively, a pair of fabric straps may be provided, in for example, a sunshade with a quadrilateral connector, each attached to and joining adjacent support means 4 so as to act as a handle. The users fingers pass through these fabric loops and allow the user to hold the sunshade 1 in such a way that it prevents the sunshade from opening due to a sudden gust of wind. The sunshade 1 can then be used as an umbrella by deploying it in the third stable position.

Figure 17:
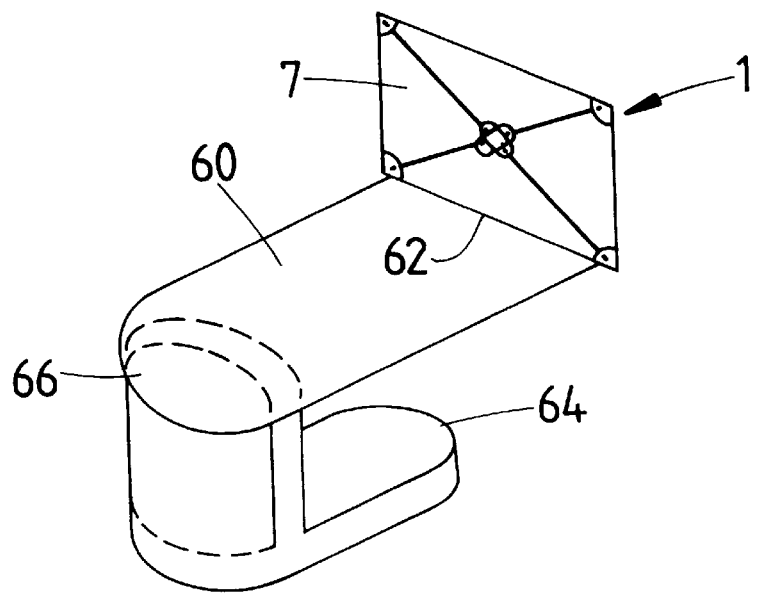
FIG. 17 illustrates another modification that can be made to the sunshade of FIGS. 10 and 11.

FIG. 17 illustrates another modification that can be made to the sunshade 1. In FIG. 17, the sunshade 1 is illustrated as being deployed against a windscreen (not shown). A side panel 60 is attached to one side or edge 62 of the sunshade 1 by way of sewing or VELCRO™ tape. The side panel 60 may be made from the same material, or a different material as the shade 7. Preferably, the side panel 60 is formed from solid nylon fabric. The side panel 60 is adapted to cover an upper portion of a vehicle seat 64 when the sunshade 1 is itself deployed against the windscreen. This is accomplished by resting an outer end 66 of the side panel 60 on top of a headrest (shown in phantom in FIG. 17) of the seat 64. Outer end 66 of the side panel 60 may also be provided with elastic binding or a pocket (to accommodate the headrest) to assist in securing the outer end 66 to the top of a headrest. When used in this manner, the side panel 60 can be effective in protecting the seat 64 from heat and sunlight (especially if the seat 64 is upholstered in leather), and in shielding objects placed on the seat 64 from external view of passerbys.

The sunshade 1 of the present invention can be used in applications other than merely shading the interior of an automobile. For example, it can be converted for use as an umbrella, as described in connection with FIGS. 16A–16C. As another example, the sunshade 1 can be used as photographic reflector by providing a reflective film or cover on the inside (ie., the bottom side of the shade 7 as designated by "IN" in FIG. 5*a* of the shade 7.

It will be apparent from the preceding description that a vehicle sunshade as described above will be relatively easy to install in a vehicle when the vehicle is parked through the single action of placing the sunshade against the windscreen and pushing the ends of the support means to expand the sunshade. Similarly, the sunshade is relatively easy to collapse and stow by the reverse action which simultaneously collapses the sunshade. In preferred embodiments, the collapsing also folds it in a compact manner for easy and safe storage within the vehicle.

Other advantages and modifications to the basic invention and its construction as described above will be apparent to those skilled in the art and all modifications and adaptations are included in the scope of the invention.

What is claimed is:

1. A collapsible sun shade, including:

a shade;

at least two supports, each support having a first end and a second end, with the second end of each support coupled to the shade at spaced-apart locations thereof; and a connector having a central portion, and one leaf coupled to the first end of each support, with each leaf hingedly connected to the central portion;

wherein the shade is adapted to assume an unstable equilibrium position in which the supports and the shade are substantially coplanar with the connector, a collapsed position when the shade and supports are on one side of the unstable equilibrium position in which the shade is folded, and a deployed position when the shade and supports are on the other side of the unstable equilibrium position in which the supports and the shade are expanded.

2. The sun shade of claim 1, wherein the at least two supports includes four supports, and the shade has four sides and four corners, with the second end of each support connected to a separate corner.

3. The sunshade of claim 1, wherein the central portion has a configuration selected from the group consisting of quadrilateral, rectangular, triangular, hexagonal, trapezoidal and pentagonal.

4. The sun shade of claim 1, wherein the central portion has one stop edge adjacent each thin section, and each leaf has one stop edge adjacent each thin section, wherein the stop edges of each corresponding leaf and the central portion engage each other when the shade is in the deployed position.

5. The sun shade of claim 1, wherein each leaf is hingedly connected to the central portion by a thin integral section.

6. A collapsible sun shade, including:

a shade having a first side;

at least two supports, each support having a first end and a second end, with the second end of each support coupled to the shade at spaced-apart locations thereof;

a connector coupled the first end of each support; and at least one suction cup positioned on the first side of the shade;

wherein the shade is adapted to assume an unstable equilibrium position in which the supports and the shade are substantially coplanar with the connector, a collapsed position when the shade and supports are on one side of the unstable equilibrium position in which the shade is folded, and a deployed position when the shade and supports are on the other side of the unstable equilibrium position in which the supports and the shade are expanded.

7. The sun shade of claim 6, further including a stop, and wherein the connector engages the stop when the shade is in the deployed position.

8. The sun shade of claim 6, wherein the connector acts as a hinge for the shade about the unstable equilibrium position.

9. The sun shade of claim 6, further including means for resiliently biasing the connector.

10. The sun shade of claim 6, wherein the means for resiliently biasing includes the shade.

11. The sun shade of claim 6, wherein the connector further includes a gripping handle.

12. The sun shade of claim 6, wherein the shade is made of an elastic material.

13. The sun shade of claim 6, wherein the shade is made of an inelastic material.

14. The sunshade of claim 6, wherein the shade is made of a material that permits visibility therethrough.

15. The sunshade of claim 6, wherein each support is made from a material selected from the group consisting of steel and plastic.

16. The sunshade of claim 6, wherein the connector is a first connector, and wherein the sunshade further includes a second connector and a connecting support having a first end coupled to the first connector and a second end coupled to the second connector, each connector coupled to the first end of at least one of the supports.

17. A collapsible umbrella, including:

a shade;

at least two supports, each support having a first end and a second end, with the second end of each support coupled to the shade at spaced-apart locations thereof; and a connector coupled to the first end of at least two of the supports and having a hole provided therein; and a shaft secured to the hole;

wherein the shade is adapted to assume an unstable equilibrium position in which the supports and the shade are substantially coplanar with the connector, a collapsed position when the shade and supports are on one side of the unstable equilibrium position in which the shade is folded, and a deployed position when the shade and supports are on the other side of the unstable equilibrium position in which the supports and the shade are expanded; and wherein the shaft is replaced with a pair of straps connecting adjacent supports to form a handle.

18. A collapsible umbrella according to claim 17 further including two straps on opposed pairs of adjacent support means.

* * * * *